(12) United States Patent
Patrick

(10) Patent No.: US 6,240,911 B1
(45) Date of Patent: Jun. 5, 2001

(54) AIR AMPLIFIER FOR NITROUS OXIDE INJECTION APPLICATION

(75) Inventor: Matthew R. Patrick, Edina, MN (US)

(73) Assignee: Competition Cams, Inc., Memphis, TN (US)

( * ) Notice: Subject to any disclaimer, the term of this patent is extended or adjusted under 35 U.S.C. 154(b) by 0 days.

(21) Appl. No.: 09/396,411

(22) Filed: Sep. 15, 1999

Related U.S. Application Data

(63) Continuation-in-part of application No. 09/325,840, filed on Jun. 4, 1999, now Pat. No. 6,105,563, which is a continuation of application No. 09/096,342, filed on Jun. 12, 1998, now Pat. No. 5,967,099.

(51) Int. Cl.$^7$ .................................................. F02B 23/00
(52) U.S. Cl. ...................... 123/585; 417/197; 123/559.1
(58) Field of Search ................................ 123/585, 559.1; 417/197

(56) References Cited

U.S. PATENT DOCUMENTS

| | | | |
|---|---|---|---|
| 3,685,614 | * | 8/1972 | Coanda et al. .................. 181/256 |
| 3,806,039 | | 4/1974 | Mocarski ......................... 239/417.3 |
| 4,046,492 | * | 9/1977 | Inglis ................................. 417/197 |
| 4,913,098 | * | 4/1990 | Battaglini ......................... 123/559.1 |
| 5,402,938 | * | 4/1995 | Sweeney ............................. 239/431 |
| 5,974,802 | * | 11/1999 | Blake ................................. 60/605.2 |

OTHER PUBLICATIONS

*Air Amplifiers*, Exair Corporation, Jun. 10, 1999.

\* cited by examiner

*Primary Examiner*—Noah P. Kamen
(74) *Attorney, Agent, or Firm*—Wilburn L. Chesser, Esq.; Piper Marbury Rudnick & Wolfe LLP

(57) ABSTRACT

An air amplifier and method and system for using a source of compressed oxygen enhancer, such as nitrous oxide, to increase air flow into an internal combustion engine, providing increased power gain for the engine over the power gain provided by the addition of the oxygen enhancer alone. A source of compressed gas is fed into an air amplifier positioned in the air intake tube for the engine, such as a hose or other conduit which leads to, for example, the throttle body for the fuel injector system. The compressed gas, which includes or is made up of an oxygen enhancer, such as nitrous oxide, is fed into the air amplifier near the inner edge of the air intake tube, producing a Coanda effect, such that air intake into the engine is greatly increased. The device is useful in conjunction with oxygen enhancer systems, such as nitrous oxide kits for feeding nitrous oxide into the throttle body for fuel injected internal combustion engines.

21 Claims, 8 Drawing Sheets

AIR AMPLIFIER FOR NITROUS OXIDE INJECTION APPLICATION

This application is a continuation-in-part of applicant's copending U.S. patent application Ser. No. 09/325,840 titled "SYSTEM, METHOD, AND DEVICE FOR NITROUS OXIDE INJECTION" filed Jun. 4, 1999, now U.S. Pat. No. 6,105,563 which is a continuation of U.S. patent application Ser. No. 09/096,342 titled "SYSTEM, METHOD, AND DEVICE FOR NITROUS OXIDE INJECTION" filed Jun. 12, 1998 now U.S. Pat. No 5,967,099.

FIELD OF THE INVENTION

This invention relates to an air amplifier for use in conjunction with an internal combustion engine, and in particular to an air amplifier for enhancing air flow to an internal combustion engine using a pressurized nitrous oxide source.

BACKGROUND

It is known in the art to enhance air flow, such as in industrial applications, using an air amplifier. A typical air amplifier works in conjunction with a flow of air through, for example, a pipe or tube. The air amplifier functions by providing a flow of compressed air around the circumference of the inner portion of the tube in the direction of the air flow through the tube. The additional compressed air flow excites the flow of air in the tube by removing the frictional resistance that air at the edges of the tube would otherwise provide. In addition, the spray of additional small amounts of compressed air adds energy to the air flow, increasing the overall air flow.

This phenomenon occurs as a result of the Coanda effect. The Coanda effect is the tendency of a gas or liquid exiting a jet adjacent to a wall contour to travel close to the wall contour even if the wall's direction of curvature is away from the axis of the jet.

A typical air amplifier for use, for example, for ventilation, exhaust, cooling, drying, and cleaning applications, is described and sold by the Exair Corporation of Cincinnati, Ohio A typical example of the Exair air amplifier. As shown on this web page, the amplifier described by Exair includes an inlet into an annular chamber for receiving compressed air. The compressed air is then throttled through a small ring nozzle at high velocity. The compressed air flow, following a Coanda profile, proceeds in a desired flow direction in a conduit, such as a ventilation shaft. A low pressure area at the center of the conduit is created by the compressed air flow, inducing a high volume flow of surrounding air through the conduit. A high volume, high velocity air flow through the conduit from the surrounding air and the compressed air flow is thus produced.

Such air amplifiers are particularly useful in applications, such as ventilating explosive gases, in which any spark or other ignition potential for the device must be avoided.

U.S. Pat. No. 3,806,039 to Mocarski discloses one nozzle that uses the Coanda effect. In the nozzle of Mocarski, pressurized fluid is directed via a slot and a spoked washer. U.S. Pat. No. 5,402,938 to Sweeney provides a similar nozzle to Mocarski for use with air flow in, for example, pneumatic control systems, using a specialized shim to provide suitable flow over a range of pressures and flow rates.

It is also known in the art to provide a flow of an oxygen enhancer, such as nitrous oxide, from a compressed source to an internal combustion engine. The nitrous oxide provides additional oxygen for increasing engine output by increasing the amount of fuel that is burnable with the oxygen from the nitrous oxide and from the oxygen from the air flow for the engine.

Accordingly, there is a need for a device, method, and system for further increasing oxygen provided to an internal combustion engine having an oxygen enhancer feed. Specifically, there is a need for a device, method, and system for using compressed nitrous oxide to enhance air flow to an internal combustion engine. There is a further need to enhance performance using energy inherent in the compressed oxygen enhancer.

SUMMARY OF THE INVENTION

It is an advantage of the present invention to meet these needs, and others, by providing an air amplifier specially designed to use flow of a compressed fluid, such as nitrous oxide gas, to enhance air flow to an internal combustion engine.

It is a further advantage of the present invention to provide an air amplifier designed for use with an existing engine air intake tube and a compressed source of nitrous oxide to enhance oxygen feed to the engine.

The present invention uses a source of compressed fluid, such as nitrous oxide, to increase air flow into an internal combustion engine, providing an additional method for gaining horsepower in conjunction with nitrous oxide injection. Nitrous oxide systems typically gain horsepower through nitrous oxide injection by utilizing the nitrous oxide as a chemical source of oxygen, and by using the intercooling effect produced by nitrous oxide gas. The present invention provides a third source for power gain by using the energy inherent in a compressed gas to provide additional horsepower to the engine via an air amplifier.

In one embodiment of the present invention, fluid from a source of compressed gas is fed into the air intake tube or conduit for the engine, and then to, for example, the throttle body for the fuel injector system. The compressed gas, in this embodiment, comprises an oxygen enhancer, such as nitrous oxide. When the compressed gas is fed into the air amplifier within the air intake near the inner edges of the air amplifier, a Coanda effect occurs, such that air intake into the engine via, for example, the throttle body, a carburetor, or other type of fuel mixture, metering, or other feeding device, greatly increases.

One example embodiment of the present invention is designed for use in conjunction with the nitrous oxide fuel injection kit that is the subject of applicant's U.S. patent application Ser. No. 09/096,342 titled "SYSTEM, METHOD AND DEVICE FOR NITROUS OXIDE INJECTION" filed Jun. 12, 1998, and continuation thereof, U.S. patent application Ser. No. 09/325,840 filed Jun. 4, 1999, both of which are hereby incorporated by reference. The present invention is not intended to be limited to use with the nitrous oxide fuel injector kit of applicant's prior application.

To achieve the stated and other advantages of the present invention, as embodied and described below, the invention includes an air amplifier for use with an internal combustion engine having an air input and a flow of pressurized fluid, the air input comprising an air input conduit, wherein an air flow is conductible through the air input conduit, and wherein the air amplifier is positionable such that the air flow is conductible through the air amplifier, the air amplifier comprising: an air amplifier body, the air amplifier body being coupleable with the air input conduit; a central opening in the air amplifier body, wherein the air flow is conductible through the central opening of the coupled air amplifier body, and wherein the central opening has an outer edge; and a circumferential passage about the central opening in the air amplifier body, the circumferential passage for transmitting the flow of the pressurized fluid, wherein the transmitted flow of the pressurized fluid is directable along the outer edge of the central opening circumferentially flowing about the air flow; wherein the transmitted flow of the pressurized fluid produces a Coanda effect, increasing the air flow through the central opening.

To achieve the stated and other advantages of the present invention, as embodied and described below, the invention further includes a method for increasing air flow to an internal combustion engine using an air amplifier and a source of pressurized fluid, wherein the engine has an air input, the air input comprising an air input conduit having an inner edge, wherein an air flow having an air flow volume is conductible through the air input conduit, and wherein the air amplifier is positioned within the air input conduit, the method comprising: providing the air flow through the air input conduit; feeding the pressurized fluid from the source of pressurized fluid to the air amplifier; and the air amplifier feeding a flow of the pressurized fluid into the air input conduit at the inner edge; wherein the air flow volume to the internal combustion engine is increased by virtue of a Coanda effect.

To achieve the stated and other advantages of the present invention, as embodied and described below, the invention further includes an air amplifier for increasing air flow to an internal combustion engine having an air input, the air input comprising an air input conduit, wherein an air flow is conductible through the air input conduit, wherein the air amplifier is positionable such that the air flow is conductible through the air amplifier, and wherein the engine has an attachable source of compressed oxygen enhancer, the air amplifier comprising: a first main body, the first main body including: an outer surface having an end section; an inner opening having a first main body circumferential curved surface; the first main body circumferential curved surface connecting a first inner opening end and a second inner opening end, and wherein the air flow is channeled by the first main body circumferential curved surface from the first inner opening end to the second inner opening end; and a first main body lip extending from the first main body circumferential curved surface at the second inner opening end; and a second main body, the second main body including: a cylindrical portion having an inner circular circumferential edge and a first end and a second end; an inner circumferential lip at the second end of the cylindrical portion; a second portion attached to the cylindrical portion at the second end of the cylindrical portion, the second portion including: a central opening in the second portion, wherein the central opening has a second main body circumferential curved surface; wherein the second main body circumferential curved surface connects a first central opening end and a second central opening end, and wherein the air flow is channeled by the second main body circumferential curved surface from the first inner opening end to the second inner opening end; a recessed edge within the second portion at the first end of the second main body circumferential curved surface; a channel within the second portion, the channel adjacent the recessed edge and circumferentially surrounding the central opening, wherein the channel has three walled sides and an open side opening at the first side of the second portion; and an orifice connected to the channel; wherein the first main body is slidably fittable into the second main body, such that the outer surface of the first main body frictionally contacts the inner surface of the cylindrical portion of the second main body, such that the end section of the first main body contacts the inner circumferential lip of the second main body, and such that a narrow passage is formed between the recessed edge of the second portion of the second main body and the end section of the first main body and between the first main body lip and a portion of the second main body circumferential curved surface; wherein the source of compressed oxygen enhancer is connected to the air amplifier via the orifice such that a feed of compressed oxygen enhancer is fed via the channel and via the formed narrow passage into the central opening such that the air flow through the air enhancer and through the air input conduit to the engine is increased using the Coanda effect.

Additional advantages and novel features of the invention will be set forth in part in the description that follows, and in part will become more apparent to those skilled in the art upon examination of the following or upon learning by practice of the invention.

DETAILED DESCRIPTION

The present invention comprises a device, method, and system for using a source of compressed oxygen enhancer, such as nitrous oxide, to increase air flow into an internal combustion engine, providing power gain for the engine over the power gain provided by the addition of the oxygen enhancer alone. In an embodiment of the present invention, a source of compressed gas is fed into an air amplifier positioned in the air intake tube for the engine, such as a hose or other conduit which leads to, for example, the throttle body for the fuel injector system. The compressed gas, which includes or is made up of an oxygen enhancer, such as nitrous oxide, is fed into the air amplifier near the inner edge of the air intake tube, producing a Coanda effect, such that air intake into the engine is greatly increased. The device is useful in conjunction with oxygen enhancer systems, such as nitrous oxide kits for feeding nitrous oxide into the throttle body for fuel injected internal combustion engines.

References will now be made in detail to an embodiment of the present invention, an example of which is illustrated in the accompanying drawings.

Figure 1:
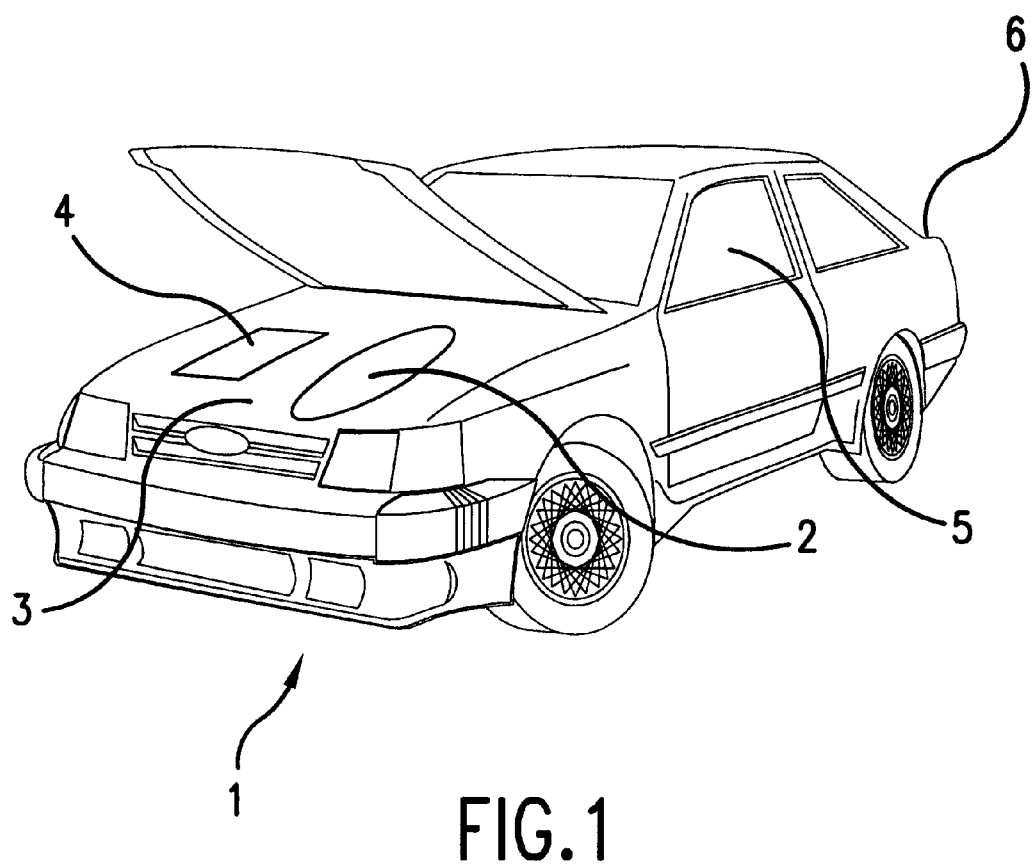
FIG. 1 presents a vehicle having an engine and oxygen enhancer feed system for use with an air amplifier in accordance with an embodiment of the present invention.

FIG. 1 presents an overview of the location of installation of an embodiment of the present invention in a typical vehicle. FIG. 1 presents a vehicle 1, such as an automobile having an engine 2, an engine compartment 3 with an oxygen enhancement device 4, such as a nitrous oxide injection device, which is primarily installed in the engine compartment 3, a passenger compartment 5, and a trunk compartment 6, in accordance an embodiment of the present invention, for use with an air amplifier installed in the engine 2.

Figure 2:
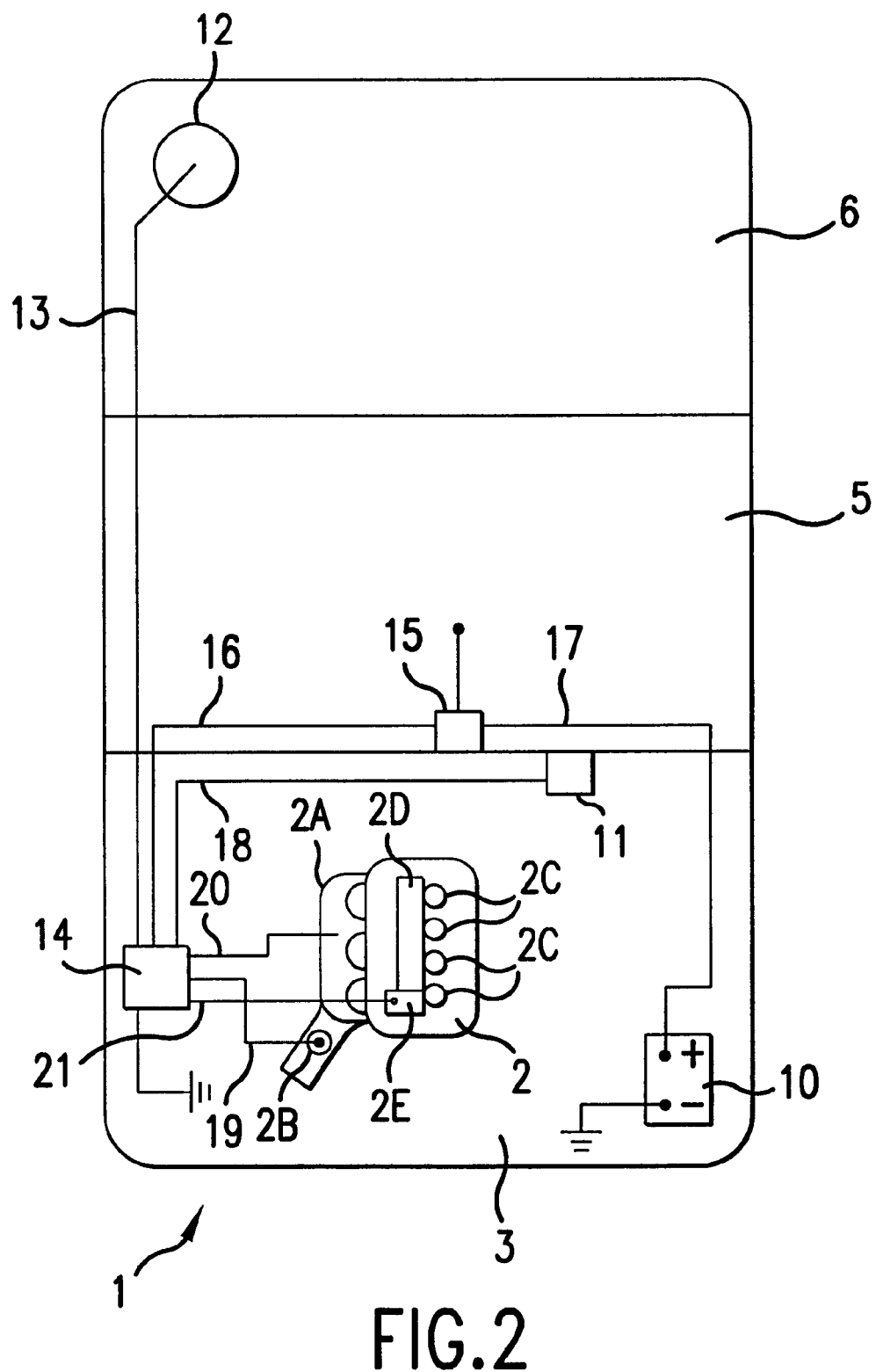
FIG. 2 depicts an overview diagram of an internal combustion engine within a vehicle, the engine having an oxygen enhancer feed and an air amplifier in accordance with an embodiment of the present invention.

FIG. 2 contains an overhead view of the installation location of an air amplifier for use with an oxygen enhancement device in accordance with an embodiment of the present invention, as installed in a typical vehicle 1. As shown in FIG. 2, the vehicle 1 includes an engine 2 having combustion chambers (not shown), with an engine intake manifold 2a and an installed air amplifier 2b in accordance with an embodiment of the present invention, installed within the air intake tube or conduit for the engine 2, leading to, for example, the fuel injectors 2c on a fuel rail 2d, and having a fuel regulator 2e, which is pressure actuated, connected to the fuel rail 2d. The engine compartment 3 further includes a battery 10 and an accelerator position indicator 11, such as a throttle position sensor (TPS) for use in conjunction with the oxygen enhancer device used in accordance with one embodiment of the present invention.

In accordance with the oxygen enhancer device for use with an embodiment of the present invention, elements of the oxygen enhancer device are contained in each of these compartments. An embodiment of the present invention includes a source of an oxygen enhancer 12, such as a tank of compressed nitrous oxide or other readily usable source of oxygen that may be stored in a compressed form, contained in the trunk compartment 6. The source of an oxygen enhancer 12 is connected by a conduit 13, such as a hose or other line, to a components unit 14. In an embodiment of the present invention, the components unit 14 includes a solenoid switch, a throttle switch, such as an electronic throttle switch, and an oxygen enhancer manifold with a pressure release vent, such as a fuel pressure jet. A switch 15 is coupled 16, by for example electrical connecting wires, to the components unit 14. The battery 10 is also coupled 17, by, for example, electrical connecting wires, to the combination unit 14 to provide an electrical power source for the device. The combination unit 14 is further coupled 18, by, for example, electrical connecting wires, to the accelerator position indicator 11.

As further shown in FIG. 2, attached to the combination unit 14 is a feed conduit 19, such as a hose, for connection to the air amplifier 2b of an embodiment of the present invention. The connection. 19a is positioned so as to direct a feed of oxygen enhancer that is transmitted from the source of the oxygen enhancer 12 via pressure through the component unit 14 into the air amplifier 2b. The air amplifier 2b, in turn, is positioned so as to feed air and the transmitted oxygen enhancer into the combustion chambers (not shown) of the engine 2. Connected to the component unit 14 is a vent conduit 20, which connects the pressure release valve (not shown) and a vent to the engine intake manifold 2a.

As further shown in FIG. 2, connecting the fuel regulator 2e and the component unit 14 is a fuel regulator conduit 21. This conduit 21 transmits pressure to the fuel regulator 2e such that fuel flow to the fuel rail 2d and hence to the fuel injectors 2c is affected by the pressure. In an embodiment of the present invention, pressure to the fuel regulator 2e varies with changes in the pressure of the oxygen enhancer transmitted into the air amplifier 2b.

Figure 3B:
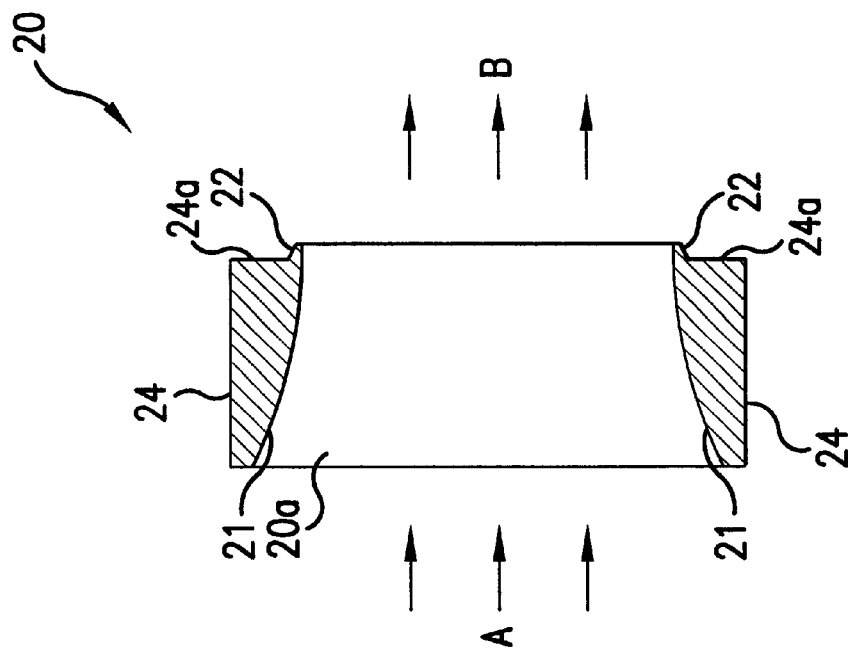
FIG. 3B presents a cross-sectional view of the front main body of FIG. 3A.
Figure 3A:
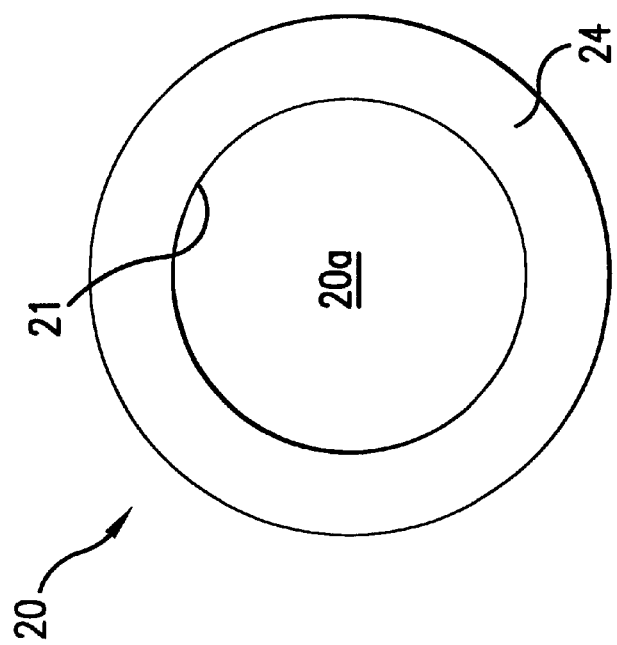
FIG. 3A shows an end view of a front main body of an air amplifier of an embodiment of the present invention.

In an embodiment of the present invention, the air amplifier, also herein referred to as an air injector, includes a first main body portion, referred to as the front main body, and a second main body portion, referred to as the rear main body. FIGS. 3A and 3B present end and cross-sectional views, respectively, of the front main body 20 of the air amplifier in accordance with an embodiment of the present invention. In an embodiment of the present invention, the front main body 20 is pressed into the rear main body 25, as shown in FIGS. 4A and 4B, to form an air amplifier 30, also known as an air injector, as shown in FIGS. 5B and 5B.

As shown in FIG. 3A, the front main body 20 generally has a circular shape as viewed from its end. In an embodiment of the present invention, in operation, an air flow entering A the front main body 20 travels from left to right, as shown in FIG. 3B, within the inner opening 20a of the front main body 20. The air flow exiting B the front main body 20 also travels from left to right, as shown in FIG. 3B. The front main body 20 includes a curved surface 21 around the inner circumference of the front main body 20, which also surrounds the inner opening 20a. As shown in FIG. 3B, this curved surface 21 channels the air flow through the front main body 20. As shown in FIG. 3B, the front main body 20 also includes a lip 22 at one end of the front main body 20 and has an outer circular edge 24, with an end section 24a adjacent to the outer circular edge 24.

Figure 4B:
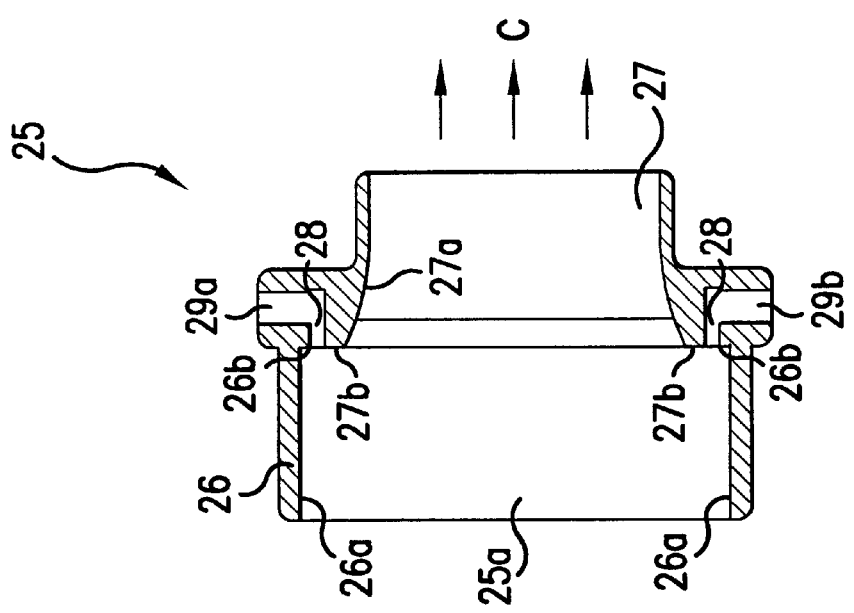
FIG. 4B presents a cross-sectional view of the rear main body of FIG. 4A.
Figure 4A:
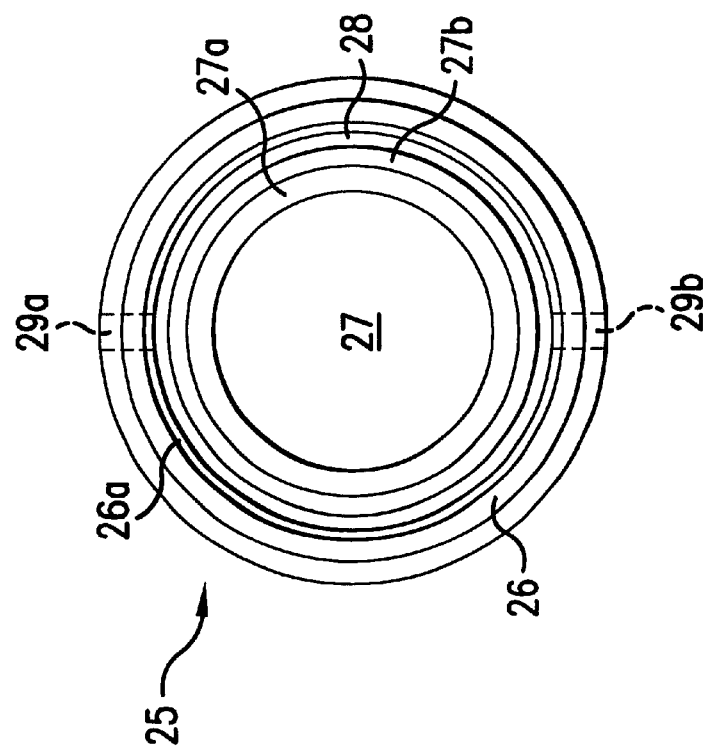
FIG. 4A shows an end view of a rear main body of an air amplifier having two orifices, in accordance with an embodiment of the present invention.

The rear main body 25, as shown in FIGS. 4A and 4B, includes an opening 25a within an inner circular circumferential edge 26a of an outer wall 26 for a generally cylindrical portion of the rear main body 25 for pressibly receiving the front main body 20. When the front main body 20 is pressibly received within the rear main body 25, the outer circular edge 24 of the front main body 20 slidably abuts the inner circular circumferential edge 26a of the rear main body 25, as shown in FIG. 5B.

Figure 5B:
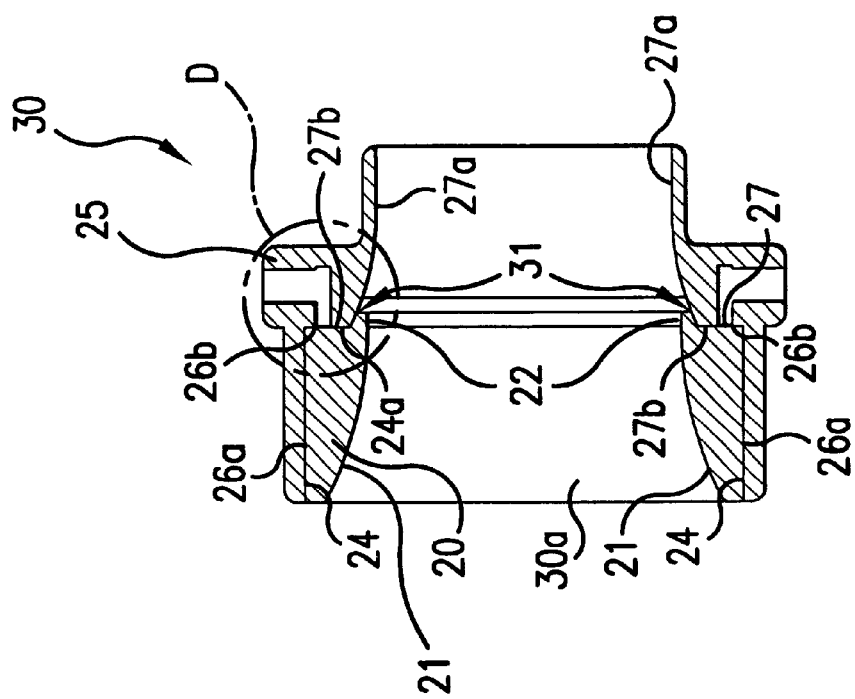
FIG. 5B is a cross-sectional view of the air amplifier of FIG. 5A.

As shown in FIG. 4B, the rear main body 25 also includes an inner circumferential lip 26b, against which the pressibly received end section 24a of the front main body 20 abuts, as shown in FIG. 5B. Also further shown in FIGS. 4A and 4B, the rear main body 25 includes a circular central opening 27, through which an air flow exiting C the rear main body 25 travels. The rear main body 25 includes a curved inner section 27a for directing the air flow exiting C. The curved inner section 27a extends from an edge 27b. In an embodiment of the present invention, the edge 27b is recessed slightly relative to the inner circumferential lip 26b, as described further below with regard to FIG. 5B.

Also included within the rear main body 4B is an annular orifice or channel 28 circumferentially surrounding a portion of the curved inner section 27a. In one embodiment of the present invention, the channel 28 is connected to two orifices 29a and 29b, such that the orifices, which thereby communicate with the channel, are located 180° from each other as viewed from an end of the rear main body, as shown in FIG. 4A. The first orifice 29a provides an opening for receiving a compressed oxygen enhancer or other fluid input, such as a pressurized nitrous oxide feed. The second orifice 29b provides a reference point, which is usable, for example, to test fluid pressure. In an embodiment of the present invention, the first and second orifices 29a, 29b optionally include fittings or other couplings, such as fittings to receive a hose fitting, and may also include, for example, a one way valve within each orifice or fitting.

Figure 4D:
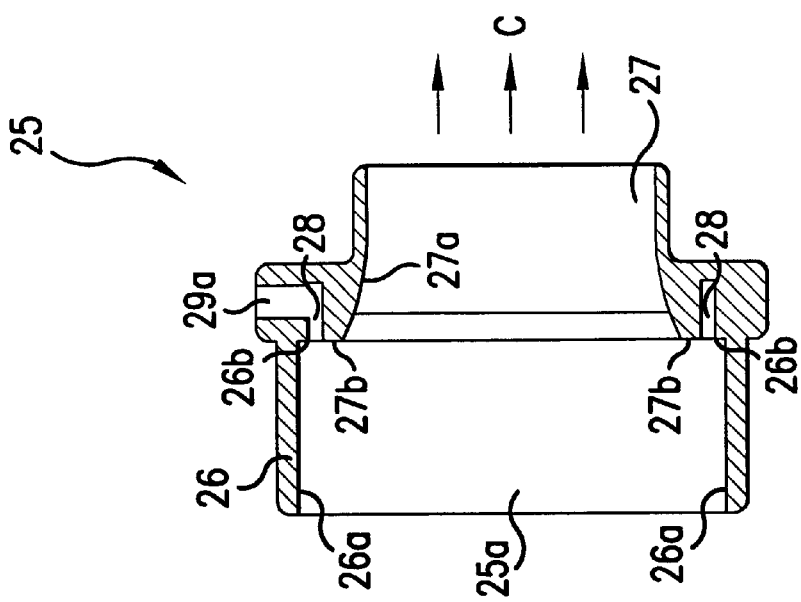
FIG. 4D presents a cross-sectional view of the rear main body of FIG. 4C.
Figure 4C:
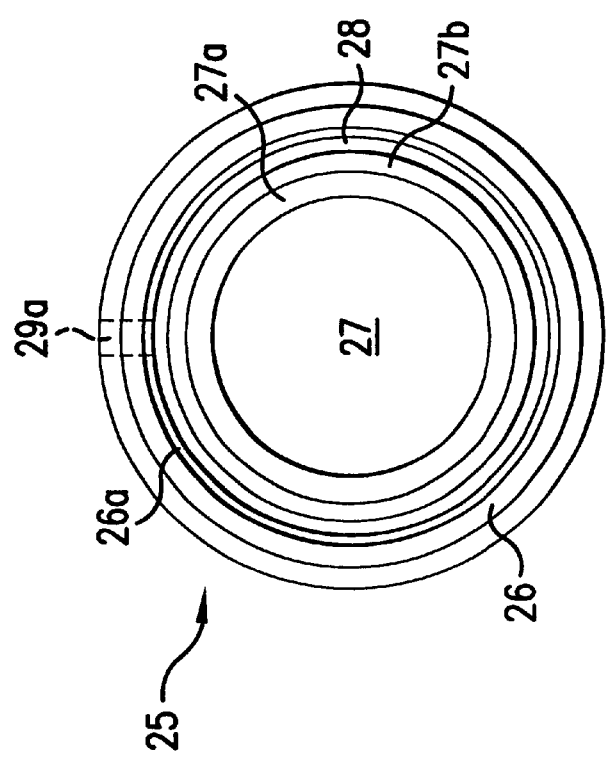
FIG. 4C shows an end view of a rear main body of an air amplifier having a single orifice, in accordance with another embodiment of the present invention.

In a second embodiment, as shown in FIGS. 4C and 4D, only a single orifice 29a is provided for receiving the compressed oxygen enhancer input.

Figure 5A:
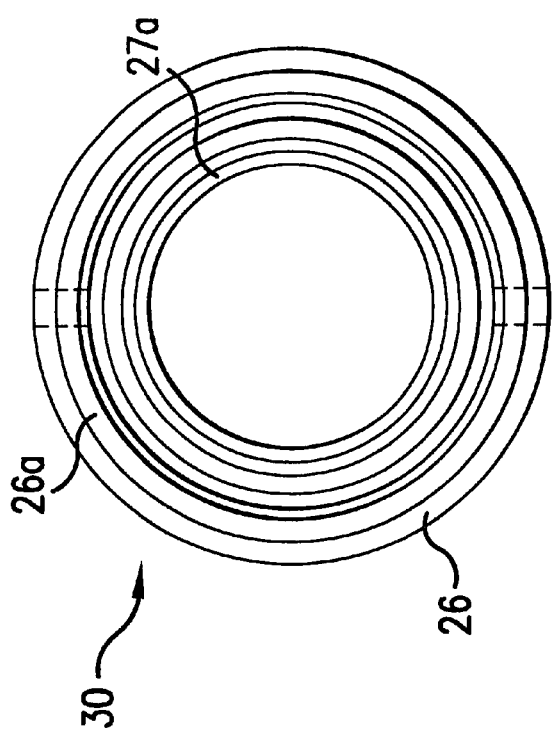
FIG. 5A depicts an end view of an assembled air amplifier having a front main section pressibly fit into a rear main section in accordance with an embodiment of the present invention.

FIGS. 5A and 5B present the assembled air amplifier 30, with front main body 20 and rear main body 25 pressibly fit together. As indicated above, upon being pressibly fit together, the front main body 20 contacts the rear main body 25 along the outer circular edge 24 and the end section 24a of the front main body 20, and along the inner circular circumferential edge 26a and the inner circular circumferential lip 26b of the rear main body 25.

The assembled air amplifier 30 has a central opening 30a for conducting an air flow through the air amplifier 30. In an embodiment of the present invention, the central opening 30a includes an outer edge formed in part by the curved surface 21 of the front main body 20, and the curved inner section 27a of the rear main body 25.

The assembled air amplifier 30 includes a narrow circumferential passage 31 that forms between the end section 24a and the lip 22 of the front main body 20, and the edge 27b and a portion of the curved inner section 27a of the rear main body 25, thereby allowing the channel 28, via the narrow circumferential passage 31, to communicate with the central opening 30a. In an embodiment of the present invention, the gap is between 0.006 and 0.012 inches. The gap has a variable width depending on the application, the type of pressurized oxygen enhancer or other gas source, and other factors. The narrow circumferential passage 31 directs the flow of pressurized oxygen enhancer in a narrow stream along the curved inner section 27a of the rear main body 25, to greatly enhance air flow through the air amplifier 30 via the produced Coanda effect.

Figure 5C:
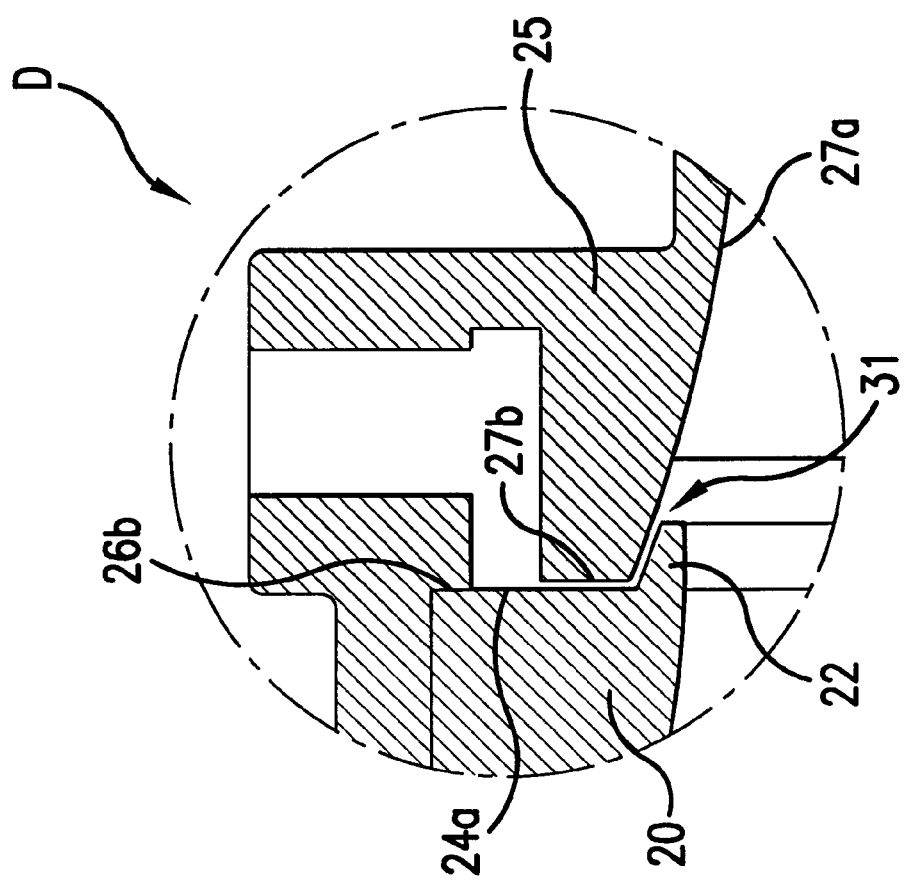
FIG. 5C presents a closeup of area D, as indicated in FIG. 5B, detailing the narrow circumferential passage and other features of an embodiment of the present invention.

FIG. 5C presents a closeup of area D, as indicated in FIG. 5B, detailing the narrow circumferential passage 31 and other features of an embodiment of the present invention.

Figure 6:
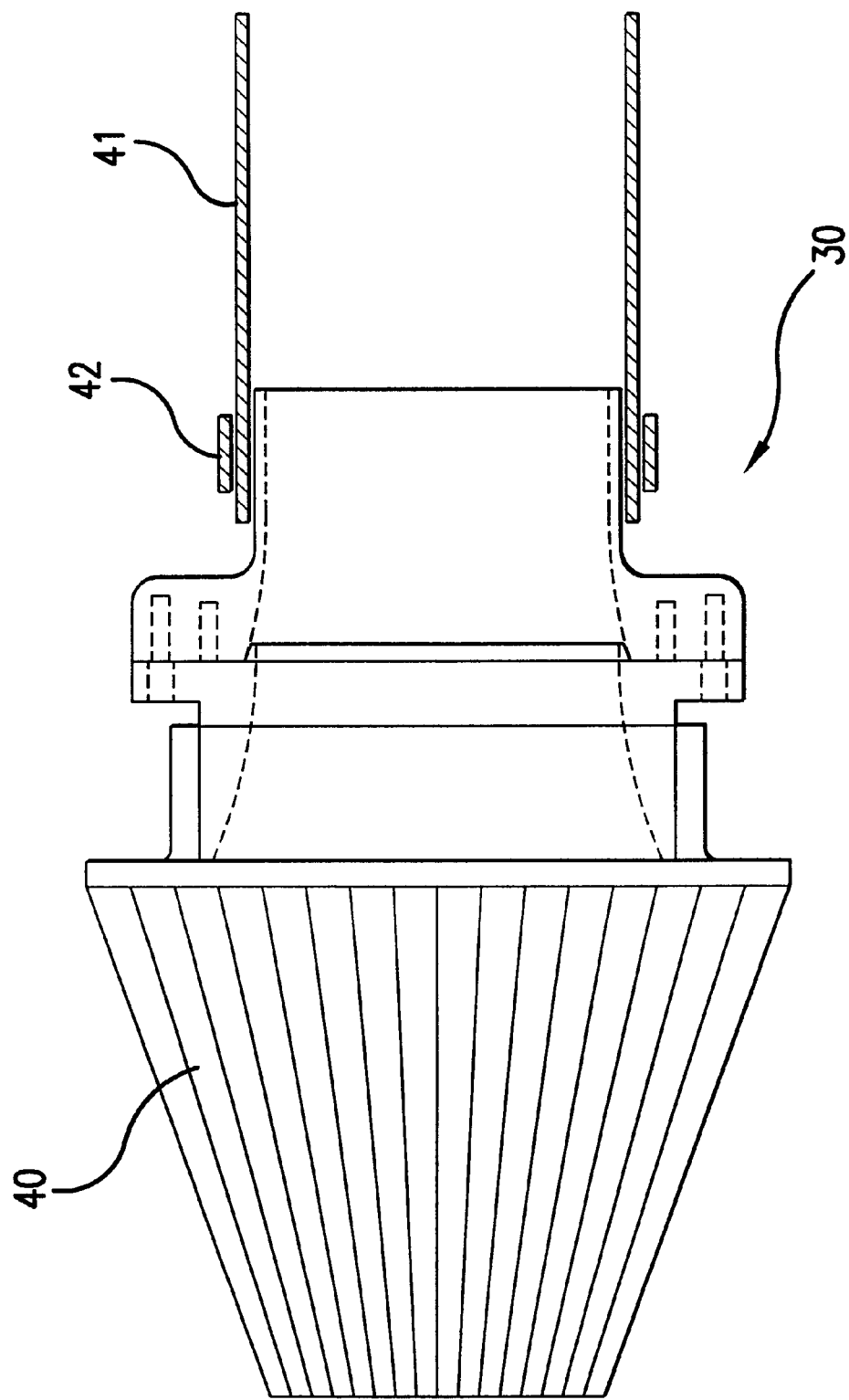
FIG. 6 shows a side view of an air intake installed in an air intake tube between a filter and a hose, in accordance with an embodiment of the present invention.

In an embodiment of the present invention, the assembled air amplifier 30 is installable using clamps, for example, within the air intake tube, typically a three inch silicone hose line between the air filter and for example, the throttle body, a carburetor, or other type of fuel mixture, metering, or other feeding device, for an automobile or other engine. For example, in FIG. 6, the assembled air amplifier 30 is shown installed between an air filter 40, such as a typical cone filter, and a hose 41 leading to, for example, the throttle body, a carburetor, or other type of fuel mixture, metering, or other feeding device, for an internal combustion engine. The hose 41 is held by, for example, a clamp 42, as shown in FIG. 6. The air amplifier 30 is also locatable, for example, anywhere along the inlet tract for the internal combustion engine.

Embodiments of the present invention have now been described. It will be appreciated that these examples are merely illustrative of the invention. Many variations and modifications will be apparent to those skilled in the art.

What is claimed is:

1. An air amplifier in combination with an internal combustion engine, comprising:

the internal combustion engine, the internal combustion engine having an air input, the air input comprising an air input conduit, wherein an air flow is conductible through the air input conduit;

a source of pressurized fluid, the source of pressurized fluid producing a flow of the pressurized fluid;

the air amplifier, the air amplifier being positionable such that the air flow is conductible through the air amplifier, the air amplifier comprising:

an air amplifier body, the air amplifier body being coupleable with the air input conduit;

a central opening in the air amplifier body, wherein the air flow is conductible through the central opening of the coupled air amplifier body, and wherein the central opening has an outer edge; and a circumferential passage about the central opening in the air amplifier body, the circumferential passage for transmitting the flow of the pressurized fluid, wherein the transmitted flow of the pressurized fluid is directable along the outer edge of the central opening circumferentially flowing about the air flow;

wherein the transmitted flow of the pressurized fluid produces a Coanda effect, increasing the air flow through the central opening; and wherein the pressurized fluid is an oxygen enhancer.

2. The air amplifier in combination with the internal combustion engine of claim 1, wherein the oxygen enhancer is nitrous oxide.

3. The air amplifier in combination with the internal combustion engine of claim 1, further comprising a first orifice communicating with the circumferential passage, the first orifice receiving the flow of the pressurized fluid.

4. The air amplifier in combination with the internal combustion engine of claim 3, wherein the first orifice comprises a coupling for connecting the air amplifier to a source for the flow of the pressurized fluid.

5. The air amplifier in combination with the internal combustion engine of claim 3, further comprising a second orifice communicating with the circumferential passage.

6. The air amplifier in combination with the internal combustion engine of claim 5, wherein the second orifice comprises a coupling for a reference pressure determination.

7. The air amplifier in combination with the internal combustion engine of claim 1, wherein the air amplifier body comprises a first main body and a second main body.

8. The air amplifier in combination with the internal combustion engine of claim 7, wherein the first main body is pressibly fittable to the second main body to form the air amplifier body.

9. The air amplifier in combination with the internal combustion engine of claim 7, wherein the first main body comprises a first main body central opening and a first main body curved inner surface, the first main body curved inner surface circumferentially surrounding the first main body central opening.

10. The air amplifier in combination with the internal combustion engine of claim 9, wherein the second main body comprises a second main body central opening and a second main body curved inner surface, the second main body curved inner surface circumferentially surrounding the second main body central opening.

11. The air amplifier in combination with the internal combustion engine of claim 10, wherein the central opening comprises the first main body central opening and the second main body central opening, and wherein the outer edge of the central opening comprises the first main body curved inner surface and the second main body curved inner surface.

12. The air amplifier in combination with the internal combustion engine of claim 7, wherein the first main body comprises a lip, and wherein the lip deflects the flow of the fluid from the narrow passage about the central opening.

13. The air amplifier in combination with the internal combustion engine of claim 1, wherein the narrow passage has a width between about 0.006 and 0.012 inches.

14. The air amplifier in combination with the internal combustion engine of claim 1, wherein the narrow passage communicates with a channel within the air amplifier body, the channel circumferentially surrounding a portion of the central opening, and the central channel communicating with the central opening via the narrow passage.

15. The air amplifier in combination with the internal combustion engine of claim 1, wherein the air input conduit comprises an air intake tube.

16. The air amplifier in combination with the internal combustion engine of claim 1, wherein the air input conduit comprises an air filter.

17. The air amplifier in combination with the internal combustion engine of claim 1, wherein the internal combustion engine comprises a fuel injection system having a throttle body, and wherein the air input conduit includes the throttle body.

18. The air amplifier in combination with the internal combustion engine of claim 1, wherein the internal combustion engine comprises a carburetor, and wherein the air input conduit includes the carburetor.

19. A method for increasing air flow to an internal combustion engine using an air amplifier and a source of pressurized fluid, wherein the engine has an air input, the air input comprising an air input conduit having an inner edge, wherein an air flow having an air flow volume is conductible through the air input conduit, and wherein the air amplifier is positioned within the air input conduit, the method comprising:

provclaing the air flow through the air input conduit;

feeding the pressurized fluid from the source of pressurized fluid to the air amplifier; and the air amplifier feeding a flow of the pressurized fluid into the air input conduit at the inner edge;

wherein the air flow volume to the internal combustion engine is increased by virtue of a Coanda effect;

wherein the pressurized fluid is nitrous oxide.

20. An air amplifier in combination with an internal combustion engine, the air amplifier for increasing air flow to the internal combustion engine, the air amplifier in combination with the internal combustion engine comprising:

the internal combustion engine, the internal combustion engine having an air input, the air input comprising an air input conduit, wherein the engine has an attachable source of compressed oxygen enhancer;

the air amplifier, the air amplifier being positionable such that the air flow is conductible through the air amplifier, the air amplifier comprising:

a first main body, the first main body including:
an outer surface having an end section;
an inner opening having a first main body circumferential curved surface; the first main body circumferential curved surface connecting a first inner opening end and a second inner opening end, and wherein the air flow is channeled by the first main body circumferential curved surface from the first inner opening end to the second inner opening end; and
a first main body lip extending from the first main body circumferential curved surface at the second inner opening end; and a second main body, the second main body including:
a cylindrical portion having an inner circular circumferential edge and a first end and a second end;
an inner circumferential lip at the second end of the cylindrical portion;
a second portion attached to the cylindrical portion at the second end of the cylindrical portion, the second portion including:
a central opening in the second portion, wherein the central opening has a second main body circumferential curved surface; wherein the second main body circumferential curved surface connects a first central opening end and a second central opening end, and wherein the air flow is channeled by the second main body circumferential curved surface from the first inner opening end to the second inner opening end;
a recessed edge within the second portion at the first end of the second main body circumferential curved surface;
a channel within the second portion, the channel adjacent the recessed edge and circumferentially surrounding the central opening, wherein the channel has three walled sides and an open side opening at the first side of the second portion; and
an orifice connected to the channel;

wherein the first main body is slidably fittable into the second main body, such that the outer surface of the first main body frictionally contacts the inner surface of the cylindrical portion of the second main body, such that the end section of the first main body contacts the inner circumferential lip of the second main body, and such that a narrow passage is formed between the recessed edge of the second portion of the second main body and the end section of the first main body and between the first main body lip and a portion of the second main body circumferential curved surface;

wherein the source of compressed oxygen enhancer is connected to the air amplifier via the orifice such that a feed of compressed oxygen enhancer is fed via the channel and via the formed narrow passage into the central opening such that the air flow through the air enhancer and through the air input conduit to the engine is increased using the Coanda effect.

21. The air amplifier in combination with the internal combustion engine of claim 20, wherein the first inner opening end has a first inner opening end diameter, and wherein the second inner opening end has a second inner opening end diameter, the first inner opening end diameter being greater than the second inner opening end diameter; and wherein the first central opening end has a first central opening end diameter, and wherein the second central opening end has a second central opening end diameter, the first central opening end diameter being greater than the second central opening end diameter.

* * * * *